US009341734B2

(12) United States Patent
Liu et al.

(10) Patent No.: US 9,341,734 B2
(45) Date of Patent: May 17, 2016

(54) APPARATUS AND METHOD FOR BED BOUNDARY DETECTION

(71) Applicants: Ce Liu, Sugar Land, TX (US); Jing Li, Houston, TX (US)

(72) Inventors: Ce Liu, Sugar Land, TX (US); Jing Li, Houston, TX (US)

( * ) Notice: Subject to any disclaimer, the term of this patent is extended or adjusted under 35 U.S.C. 154(b) by 414 days.

(21) Appl. No.: 13/786,302

(22) Filed: Mar. 5, 2013

(65) Prior Publication Data

US 2014/0257704 A1   Sep. 11, 2014

(51) Int. Cl.
*G06F 11/00* (2006.01)
*G01V 3/30* (2006.01)
*E21B 47/022* (2012.01)

(52) U.S. Cl.
CPC ............ *G01V 3/30* (2013.01); *E21B 47/02216* (2013.01)

(58) Field of Classification Search
CPC ............. G01V 3/28; G01V 3/26; G01V 3/30; E21B 47/026
USPC .......................... 702/8, 13, 14, 182–185, 188
See application file for complete search history.

(56) References Cited

U.S. PATENT DOCUMENTS

| 6,466,872 | B1 * | 10/2002 | Kriegshauser | G01V 3/28 702/11 |
| 7,659,722 | B2 | 2/2010 | Bittar | |
| 7,952,358 | B2 | 5/2011 | Wang et al. | |
| 8,085,050 | B2 * | 12/2011 | Bittar | G01V 3/28 324/323 |
| 2006/0253255 | A1 * | 11/2006 | Omeragic | G01V 3/28 702/9 |
| 2011/0133740 | A1 * | 6/2011 | Seydoux | G01V 3/26 324/338 |

* cited by examiner

*Primary Examiner* — Edward Raymond
(74) *Attorney, Agent, or Firm* — Lai, Corsini, Lapus, LLC; Theodore Lapus

(57) ABSTRACT

A method for performing detection of a bed boundary can include deploying a tool body with a longitudinal axis in a borehole, modulating the magnetic moments of electromagnetic signals to be transmitted by the first transmitter and the second transmitter, firing the first transmitter and the second transmitter substantially simultaneously, utilizing the receiver to receive and measure the modulated electromagnetic signals from the first transmitter and the second transmitter, and computing the orientation and location of the bed boundary based on the amplitudes and phases of the electromagnetic signals received and measured at the receiver. The tool body can be deployed with a first transmitter, a second transmitter, and a receiver, all of which are oriented in different directions. The vector of the total magnetic moment of the modulated electromagnetic signals can electrically rotate during firing. A corresponding apparatus for detection of a bed boundary is also provided.

23 Claims, 14 Drawing Sheets

APPARATUS AND METHOD FOR BED BOUNDARY DETECTION

FIELD OF THE INVENTION

The present invention relates generally to the field of electrical logging of oil wells. More particularly, the invention relates to an apparatus and a method for detecting the location and orientation of a bed boundary.

BACKGROUND OF THE INVENTION

The use of electrical measurements for gathering of downhole information, such as logging while drilling ("LWD"), measurement while drilling ("MWD"), and wireline logging system, is well known in the oil industry. Such technology has been utilized to obtain downhole information, such as formation resistivity (or conductivity; the terms "resistivity" and "conductivity", though reciprocal, are often used interchangeably in the art.), dielectric constant, etc, to determine the petrophysical properties of a subterranean formation and the fluids therein accordingly. The collected downhole information can help delineate hydrocarbon (such as crude oil or gas) and other contents in the porous formation and identify bed boundary in between different formations. It is preferable to keep the borehole in the pay zone (the formation with hydrocarbons) as much as possible so as to maximize the recovery.

Various measurement tools exist for use in LWD, MWD, or wireline logging system. One such tool is a resistivity tool. FIG. 1 shows a conventional resistivity tool, which includes a drill string 100, a pair of transmitters T1 and T2 for transmitting electromagnetic signals through surrounding formation, a pair of receivers R1 and R2 for receiving electromagnetic signals from the pair of transmitters T1 and T2, and a drill bit 112 at a distal end of the drill string 100. Compared to the transmitter T2, the transmitter T1 is closer to the pair of receivers R1 and R2.

In FIG. 1, the drill string 100 rotates and moves in a first bed formation 102 toward a bed boundary 106 between the first bed formation 102 and a second bed formation 104. When the drill string 100 is approaching the bed boundary 106, electromagnetic signals sourced from the transmitter T2 108 start penetrating the bed boundary 106, propagate through the second bed formation 104, and then are received by the pair of receivers R1 and R2. However, at the same time, electromagnetic signals sourced from the transmitter T1 110 still propagate through the first formation 102 only and then are received by the pair of receivers R1 and R2 at the end. Accordingly, the resistivity data measured by the transmitter T1 would be different from the resistivity data measured by the transmitter T2. The difference of measured resistivity indicates the presence of the bed boundary 106.

To keep a resistivity tool staying within the pay zone, a decision of steering the resistivity tool requires not only information of the location of a formation boundary, but also information of its orientation. The resistivity tool shown in FIG. 1 can not identify the orientation of the bed boundary 106 with respect to the drill string 100. Therefore, a "directional" resistivity tool was invented accordingly. The directional resistivity tool can be azimuthally sensitive by collecting logging information on azimuthally different angles while rotating. As shown in FIG. 2, a borehole can be divided into a number of bins (or sectors) 200~230. Conventionally, the number of bins is 16 or 32. The location and orientation of a formation boundary can be computed based on the correlation results of measured resistivities from each bin. However, mechanical rotation of the directional resistivity tool brings some disadvantages. For example, the vibration and shaking of the directional resistivity tool would significantly affect the accuracy of data measurements. Furthermore, the speed of mechanical rotation has physical limitation.

So far some procedures have been implemented to avoid vibration problems, such as stopping the tool in each bin while conducting measurements in this bin. It may solve the vibration problems, but greatly prolongs the process of data measurements.

As described above, a need exists for an improved apparatus and method for detecting the location and orientation of a bed boundary without requiring the apparatus to rotate mechanically.

A further need exists for an improved apparatus and method for detecting the location and orientation of bed boundary without vibration or shaking issues causing inaccuracy of data measurements.

A further need exists for an improved apparatus and method for detecting the location and orientation of a bed boundary in an efficient way.

The present embodiments of the apparatus and the method meet these needs and improve on the technology.

SUMMARY OF THE INVENTION

This section provides a general summary of the disclosure, and is not a comprehensive disclosure of its full scope or its entire feature.

In one preferred embodiment, a method for performing detection of a bed boundary includes deploying a tool body with a longitudinal axis in a borehole, modulating the magnetic moments of electromagnetic signals to be transmitted by the first transmitter and the second transmitter, firing the first transmitter and the second transmitter substantially simultaneously, utilizing the receiver to receive and measure the modulated electromagnetic signals from the first transmitter and the second transmitter, and computing the orientation and location of the bed boundary based on the amplitudes and phases of the electromagnetic signals received and measured at the receiver.

In some embodiments, the tool body is deployed with a first transmitter, a second transmitter, and a receiver, all of which are oriented in different directions.

In some embodiments, the vector of the total magnetic moment of the modulated electromagnetic signals electrically rotates during firing.

In some embodiments, the orientations of the first transmitter, the second transmitter, and the receiver are substantially perpendicular to each other.

In some embodiments, the orientation of the receiver is substantially parallel to the longitudinal axis of the tool body.

In some embodiments, the method for performing detection of a bed boundary further includes providing an equation $$\begin{cases} m_1 = m_0 \cos(\Omega t) \\ m_2 = m_0 \sin(\Omega t) \end{cases}$$

to modulate the magnetic moments of the electromagnetic signals to be transmitted by the first and the second transmitters; where $m_1$ and $m_2$ are magnetic moments applied to the first transmitter and the second transmitter, respectively; $m_0$ is the magnitude of the magnetic moment; $\Omega$ is an angular frequency of the electrical rotation of the magnetic moments of the modulated electromagnetic signals; and t is a length of time from start of the electrical rotation.

In some embodiments, the angular frequency is adjustable.

In other embodiments, the method for performing detection of a bed boundary further includes measuring the modulated electromagnetic signals from the first transmitter and the second transmitter at different electrical rotation angles.

In other embodiments, the method for performing detection of a bed boundary further includes providing a conversion chart to facilitate a computation of the orientation and location of the bed boundary based on the amplitudes and phases of the electromagnetic signals received and measured at the receiver.

In some embodiments, the method for performing detection the distance of a bed boundary further includes retrieving information of formation resistivity from a logging tool which is coupled with the tool body.

In still other embodiments, the method for performing detection of a bed boundary further includes providing a conversion chart to facilitate a computation of the orientation and location of the bed boundary based on the amplitudes and phases of the electromagnetic signals received and measured at the receiver and the information of formation resistivity retrieved from the logging tool.

In one preferred embodiment, an apparatus for detection of a bed boundary includes a tool body with a longitudinal axis, a first transmitter deployed on the tool body and oriented in a first direction, a second transmitter deployed on the tool body and oriented in a second direction, and a receiver deployed on the tool body and oriented substantially parallel to the longitudinal axis of the tool body.

In some embodiments, the first transmitter and the second transmitter transmit electromagnetic signals, the magnetic moments of which are modulated to make the vector of the total magnetic moment of the electromagnetic signals to electrically rotate while the first transmitter and the second transmitter are fired substantially simultaneously.

In some embodiments, the receiver receives and measures the modulated electromagnetic signals from the first transmitter and the second transmitter and computes the orientation and location of the bed boundary based on the measured amplitudes and phases of the electromagnetic signals.

In some embodiments, the tool body is a drill string or a drill collar.

In some embodiments, the first transmitter is collocated with or at an axial distance from the second transmitter.

In some embodiments, all of the first transmitter, the second transmitter, and the receiver include at least one antenna.

In some embodiments, the first direction of the first transmitter is substantially perpendicular to the second direction of the second transmitter.

In some embodiments, the receiver is oriented perpendicular to the first direction of the first transmitter and the second direction of the second transmitter.

In some embodiments, the electromagnetic signals are modulated according to an equation $$\begin{cases} m_1 = m_0 \cos(\Omega t) \\ m_2 = m_0 \sin(\Omega t) \end{cases};$$

where $m_1$ and $m_2$ are magnetic moments applied to the first transmitter and the second transmitter, respectively; $m_0$ is the magnitude of the magnetic moment; $\Omega$ is an angular frequency of the electrical rotation of the magnetic moments of the modulated electromagnetic signals; and t is a length of time from start of the electrical rotation.

In some embodiments, the first and second transmitters include a transmitter circuit to modulate the electromagnetic signals to be transmitted.

In some embodiments, the receiver includes a receiver circuit configured to process the received electromagnetic signals and analyze their amplitudes and phases.

In some embodiments, the receiver circuit is coupled with a processor configured to help compute the orientation and location of the bed boundary.

In still some embodiments, the processor is coupled with a storage device which is stored with a conversion chart to facilitate a computation of the orientation and location of the bed boundary based on the amplitudes and phases of the electromagnetic signals received and measured at the receiver.

In another preferred embodiment, an apparatus for detection of a bed boundary includes a tool body with a longitudinal axis, a first transmitter deployed on the tool body, a second transmitter deployed on the tool body and substantially perpendicular to the first transmitter, and a receiver deployed on the tool body and oriented substantially parallel to the longitudinal axis of the tool body.

In some embodiments, the first transmitter and the second transmitter transmit electromagnetic signals, the magnetic moments of which are modulated to make the vector of the total magnetic moment of the electromagnetic signals to electrically rotate as a function of time while the first transmitter and the second transmitter are fired substantially simultaneously.

In other embodiments, the receiver receives and measures the modulated electromagnetic signals from the first transmitter and the second transmitter and computes the orientation and location of the bed boundary based on the measured amplitudes and phases of the electromagnetic signals.

In still other embodiments, the apparatus for detection of a bed boundary further includes a logging tool for measuring formation resistivity.

In another embodiment, the receiver comprises a conversion chart to convert the correlated information of the amplitudes of the electromagnetic signals measured at the receiver and formation resistivity measured by the logging tool into the orientation and location of the bed boundary.

BRIEF DESCRIPTION OF THE DRAWINGS

The drawings described herein are for the purposes of illustrating selected embodiments and not all possible implementations, and are not intended to limit the scope of the present disclosure.

The detailed description will be better understood in conjunction with the accompanying drawings as follows.

The present embodiments are detailed below with reference to the listed Figures.

DETAILED DESCRIPTION OF THE EMBODIMENTS

Figure 3A:
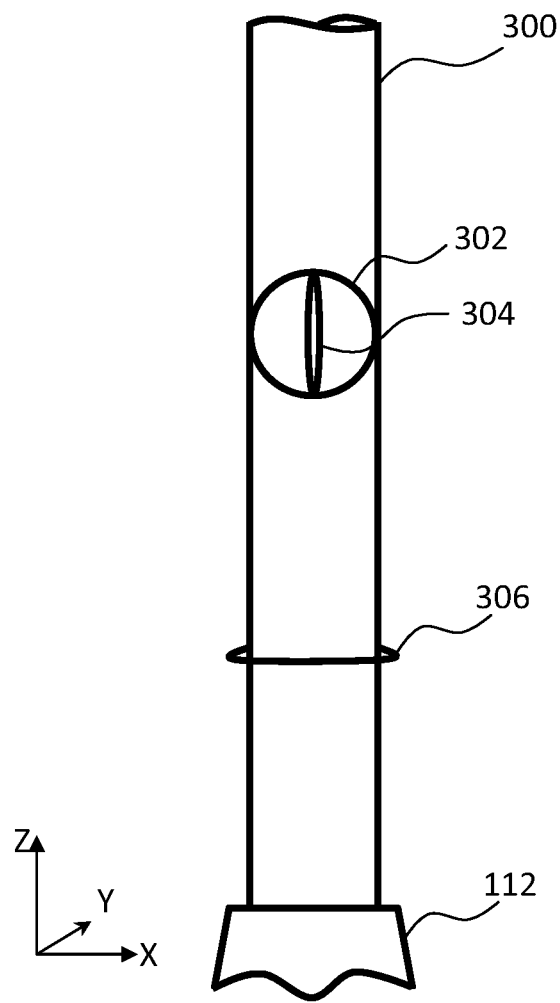
FIG. 3A illustrates a front view of a directional resistivity tool according to some embodiments of the present invention.

FIG. 3A illustrates a front view of a directional resistivity tool according to some embodiments of the present invention. The directional resistivity tool can include a tool body 300, two transmitters with x-direction and y-direction axes: an x-transmitter 304 and a y-transmitter 302, a receiver with a z-direction axis: a z-receiver 306, and the drill bit 112 at a distal end of the tool body 300. A coordinate system (x,y,z) associated with the tool body 300 is shown. The direction of the longitudinal axis of the tool body 300 is defined as the z-direction in the present coordinate system (x,y,z). The x-transmitter 304, the y-transmitter 302, and the z-receiver 306 can include one or more antennas to transmit or receive electromagnetic signals. The x-transmitter 304 can be collocated with the y-transmitter 302 or at an axial distance from the y-transmitter 302.

In some embodiments, the tool body 300 can be a drill collar or a drill string.

In some embodiments, the orientations of the transmitters can vary.

The present invention is in no way limited to any particular number, orientation, or shape of the transmitter and the receiver.

To make directional measurements, instead of rotating the tool body 300 mechanically, the tool body 300 can be standstill by utilizing an electrical rotation technique to electrically sweep the polarization of the total magnetic moment of the x-transmitter 304 and the y-transmitter 302, to mimic the effect of mechanical rotation of the tool body 300. The electrical rotation technique can be initiated from modulating electromagnetic signals transmitted out by the x-transmitter 304 and the y-transmitter 302. The magnetic moments of the modulated electromagnetic signals can be expressed in Equation (1) below.

$$\begin{cases} m_x = m_0 \cos(\Omega t) \\ m_y = m_0 \sin(\Omega t) \end{cases} \quad (1)$$

where $m_x$ and $m_y$ can be the magnetic moments applied to the x-transmitter 304 and the y-transmitter 302, respectively; $m_0$ can be the magnitude of the magnetic moment; $\Omega$ can be an angular frequency of the electrical rotation of the magnetic moments of the modulated electromagnetic signals; and t can be a length of time from start of the electrical rotation.

Based on the modulation shown in Equation (1), the total magnetic moment $\vec{M}$ of the pair of the x-transmitter 304 and the y-transmitter 302 can be expressed by Equation (2) below.

$$\vec{M} = \hat{x} m_0 \cos(\Omega t) + \hat{y} m_0 \sin(\Omega t) \quad (2)$$

where $\hat{x}$ and $\hat{y}$ denote the unit vector in x-direction and y-direction respectively.

Figure 3B:
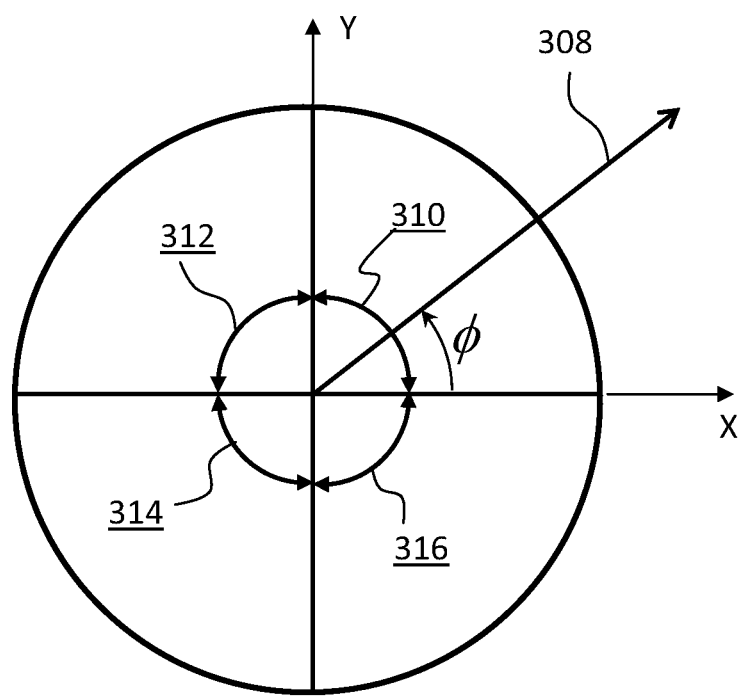
FIG. 3B illustrates the total magnetic moment $\vec{M}$ of a pair of an x-transmitter and a y-transmitter shown on an x-y plane.

FIG. 3B illustrates the total magnetic moment $\vec{M}$ of the pair of the x-transmitter 304 and the y-transmitter 302 shown on an x-y plane. The total magnetic moment $\vec{M}$ of the pair of the x-transmitter 304 and the y-transmitter 302 can have an electrical rotation vector 308. $\phi$ is the angle of the electrical rotation vector 308 measured counterclockwise from the positive x-axis. $\phi$ can be set equal to $\Omega t$ as a time function for mimicking the behavior of mechanical rotation of a conventional resistivity tool. The time duration for a complete measurement cycle is therefore equal to $2\pi/\Omega$. The angular frequency $\Omega$ of the electrical rotation of the magnetic moments of the modulated electromagnetic signals can be in the same magnitude of the mechanical rotation speed for a conventional resistivity tool. Furthermore, the angular frequency $\Omega$ of the electrical rotation of the magnetic moments of the modulated electromagnetic signals can even be faster because the electrical rotation has no any physical limitation like the mechanical rotation does. Based on the Equation (2), the total magnetic moment $\vec{M}$ measured as a counterclockwise rotation from the positive x-axis can be expressed as following Equations (3-11) at different time between t=0 to $2\pi$. A complete cycle of rotation from degrees 0 to $2\pi$ from the positive x-axis can be divided into four quadrants: the first quadrant 310, the second quadrant 312, the third quadrant 314, and the fourth quadrant 316.

At $t=0$, $\vec{M} = \hat{x} m_0$ \quad (3)

The total magnetic moment $\vec{M}$ of the pair of the x-transmitter 304 and the y-transmitter 302 can have an electrical rotation vector 308 in the direction of the positive x-axis.

At $t=\pi/(4\Omega)$, $\vec{M} = (\hat{x}+\hat{y})m_0/\sqrt{2}$ \quad (4)

The total magnetic moment $\vec{M}$ of the pair of the x-transmitter 304 and the y-transmitter 302 can have an electrical rotation vector 308 with an angle of 45 degrees measured counterclockwise from the positive x-axis.

At $t=\pi/(2\Omega)$, $\vec{M} = \hat{y} m_0$ \quad (5)

The total magnetic moment $\vec{M}$ of the pair of the x-transmitter 304 and the y-transmitter 302 can have an electrical rotation vector 308 in the direction of the positive y-axis.

At $t=3\pi/(4\Omega)$, $\vec{M} = (-\hat{x}+\hat{y})m_0/\sqrt{2}$ \quad (6)

The total magnetic moment $\vec{M}$ of the pair of the x-transmitter 304 and the y-transmitter 302 can have an electrical rotation vector 308 with an angle of 135 degrees measured counterclockwise from the positive x-axis.

$$\text{At } t=\pi(\Omega), \vec{M}=-\hat{x}m_0 \qquad (7)$$

The total magnetic moment $\vec{M}$ of the pair of the x-transmitter 304 and the y-transmitter 302 can have an electrical rotation vector 308 in the direction of the negative x-axis.

$$\text{At } t=5\pi(4\Omega), \vec{M}=(-\hat{x}-\hat{y})m_0/\sqrt{2} \qquad (8)$$

The total magnetic moment $\vec{M}$ of the pair of the x-transmitter 304 and the y-transmitter 302 can have an electrical rotation vector 308 with an angle of 225 degrees measured counterclockwise from the positive x-axis.

$$\text{At } t=3\pi/(2\Omega), \vec{M}=-\hat{y}m_0 \qquad (9)$$

The total magnetic moment $\vec{M}$ of the pair of the x-transmitter 304 and the y-transmitter 302 can have an electrical rotation vector 308 in the direction of the negative y-axis.

$$\text{At } t=7\pi/(4\Omega), \vec{M}=(\hat{x}-\hat{y})m_0/\sqrt{2} \qquad (10)$$

The total magnetic moment $\vec{M}$ of the pair of the x-transmitter 304 and the y-transmitter 302 can have an electrical rotation vector 308 with an angle of 315 degrees measured counterclockwise from the positive x-axis.

$$\text{At } t=2\pi/(\Omega), \vec{M}=\hat{x}m_0 \qquad (11)$$

The total magnetic moment $\vec{M}$ of the pair of the x-transmitter 304 and the y-transmitter 302 can have an electrical rotation vector 308 back in the direction of the positive x-axis, which is the same as the direction of the electrical rotation vector 308 at the very beginning of the cycle of rotation. Equation (3) is therefore equal to Equation (11).

In some embodiments, the tool body 300 still can mechanically rotate while the electrical rotation technique is being applied.

Figure 3C:
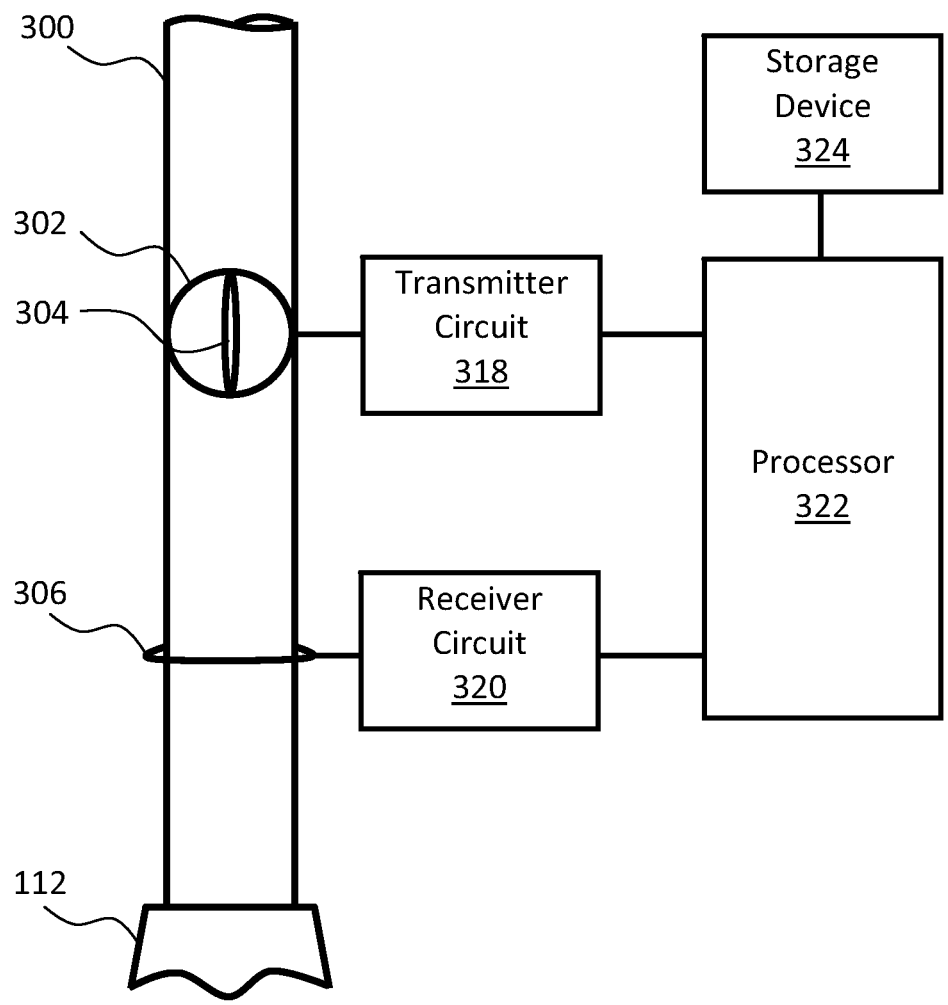
FIG. 3C illustrates a schematic presentation, partially in block diagram form, of the directional resistivity tool shown in FIG. 3A.

FIG. 3C illustrates a schematic presentation, partially in block diagram form, of the directional resistivity tool shown in FIG. 3A. The x-transmitter 304 and the y-transmitter 302 can further include a transmitter circuit 318 to modulate the electromagnetic signals to be transmitted out by the antennas of the x-transmitter 304 and the y-transmitter 302. The z-receiver 306 can further include a receiver circuit 320 to process electromagnetic signals received by the antennas of the z-receiver 306 from the x-transmitter 304 and the y-transmitter 302 and analyze their amplitudes and phases.

In some embodiments, the receiver circuit 320 can be coupled with a processor 322 to help process and analyze the amplitudes and phases of the received electromagnetic signals and compute the orientation and location of a bed boundary nearby the tool body 300 accordingly.

In some embodiments, the transmitter circuit 318 also can be coupled with the processor 322.

In some embodiments, the tool body 300 can further be coupled with one or more logging tools (not shown in FIG. 3A or 3C) for measuring resistivity, dielectric constant, and permeability of surrounding formation. The location of a bed boundary nearby the tool body 300 can also be computed according to the correlation results of amplitudes and phases of the electromagnetic signals received at the z-receiver 306 and the information of resistivity, dielectric constant and permeability of surrounding formation computed by the logging tool. Accordingly, the location of a bed boundary (the distance from the tool body 300 to a bed boundary) can be derived as a function of the amplitudes of measured electromagnetic signals (signal voltages), resistivities of two formations with a bed boundary in between, dielectric constants of two formations with a bed boundary in between, and permeabilities of two formations with a bed boundary in between as Equation (12) below.

$$d=f(V_{max}, R_1, R_2, \epsilon_1, \epsilon_2, \mu_1, \mu_2) \qquad (12)$$

where d can be the distance between the tool body 300 and a bed boundary; $V_{max}$ can be the maximum voltage of measured electromagnetic signals; $R_1$ and $R_2$ can be the resistivities of two formations on two sides of a bed boundary; $\epsilon_1$ and $\epsilon_2$ can be the dielectric constants of two formations on two sides of a bed boundary; and $\mu_1$ and $\mu_2$ can be the permeabilities of two formations on two sides of a bed boundary.

When three or more formations are near a bed boundary, Equation (12) may require more variables because more information of resistivity, dielectric constant, and permeability is involved.

However, if electromagnetic signals are at low frequency, the resistivities of two formations would be in a dominant role to decide the distance between the tool body 300 and a bed boundary. Accordingly, Equation (12) should be changed to Equation (13) below while operating at low frequency.

$$d=f(V_{max}, R_1, R_2) \qquad (13)$$

In some embodiments, the information of resistivity, dielectric constant and permeability of surrounding formation can be provided by other multi-depth resistivity tool(s) deployed on the tool body 300.

In some embodiments, the processor 322 can be coupled with a storage device 324, which can be stored with one or more pre-built conversion chart(s). The conversion chart can be a multi-dimensional look-up table which is pre-calculated by using an electromagnetic forward modeling software. Therefore, the pre-built conversion chart(s) can save the time to actually "calculate" the information of the location and orientation of a bed boundary based on the measured raw data of amplitudes and phases of electromagnetic signals. The conversion process can utilize an interpolation and/or extrapolation algorithm.

The pre-built conversion charts can include (1) a chart to convert the measured amplitudes and phases of electromagnetic signals into corresponding information of orientation and location of a nearby bed boundary; (2) a chart to convert the measured amplitudes of electromagnetic signals and the information of formation resistivity, formation dielectric constant, and formation permeability into information of location of a nearby bed boundary; and (3) a chart to convert the measured amplitudes of electromagnetic signals and the information of formation resistivity into information of location of a nearby bed boundary.

The present invention is in no way limited to any particular information combination for being used with conversion charts.

Figure 4A:
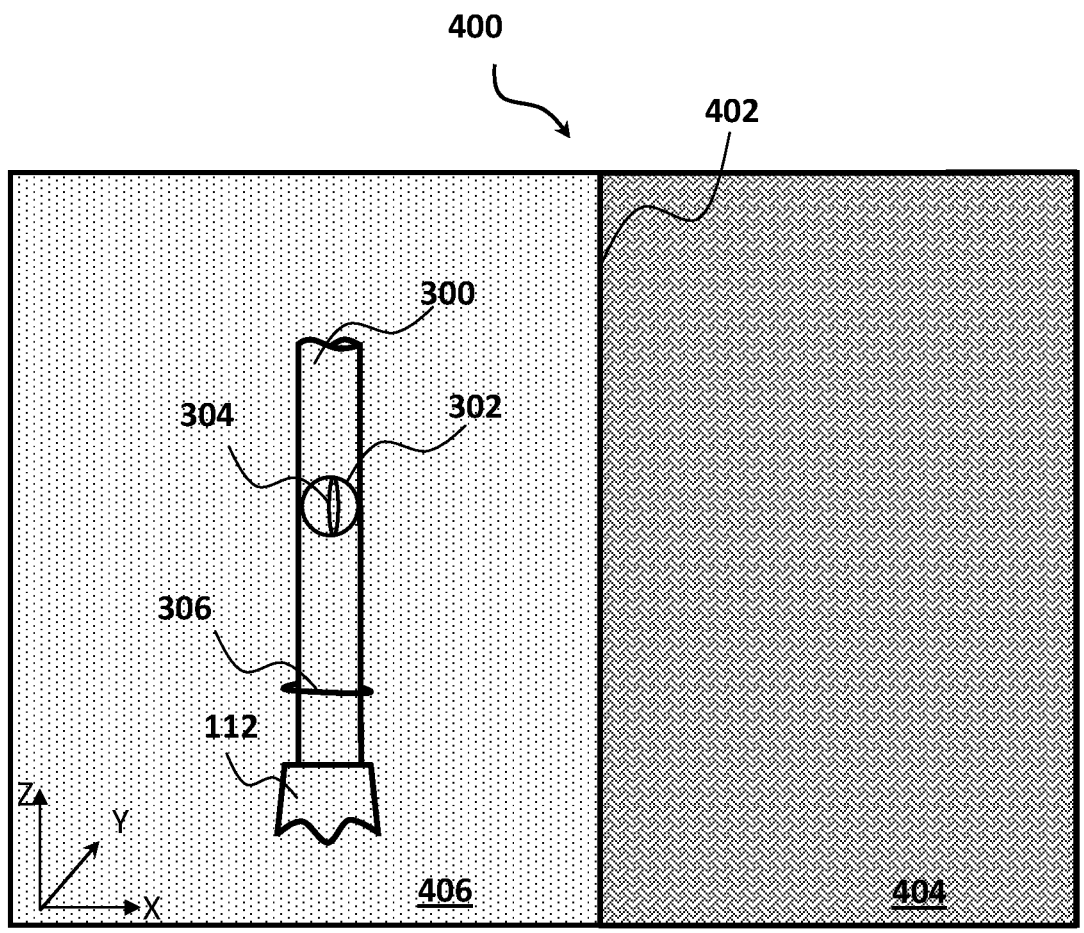
FIG. 4A illustrates an exemplary model to demonstrate that directional measurements can be performed by applying an electrical rotation technique according to some embodiments of the present invention.

FIG. 4A illustrates an exemplary model 400 to demonstrate that directional measurements can be performed by applying the electrical rotation technique according to some embodiments of the present invention. The model 400 can include a first formation 404, a second formation 406, and a boundary 402 located in between the first formation 404 and the second formation 406. The surface of the boundary 402 can be substantially parallel to the z-y plane. The directional resistivity tool with a longitudinal axis in the z-direction according to some embodiments of the present invention can be put in the second formation 406 to initial measurements. The electromagnetic signals to be transmitted by the x-transmitter 304 and the y-transmitter 302 can be modulated according to Equation (1).

Figure 4B:
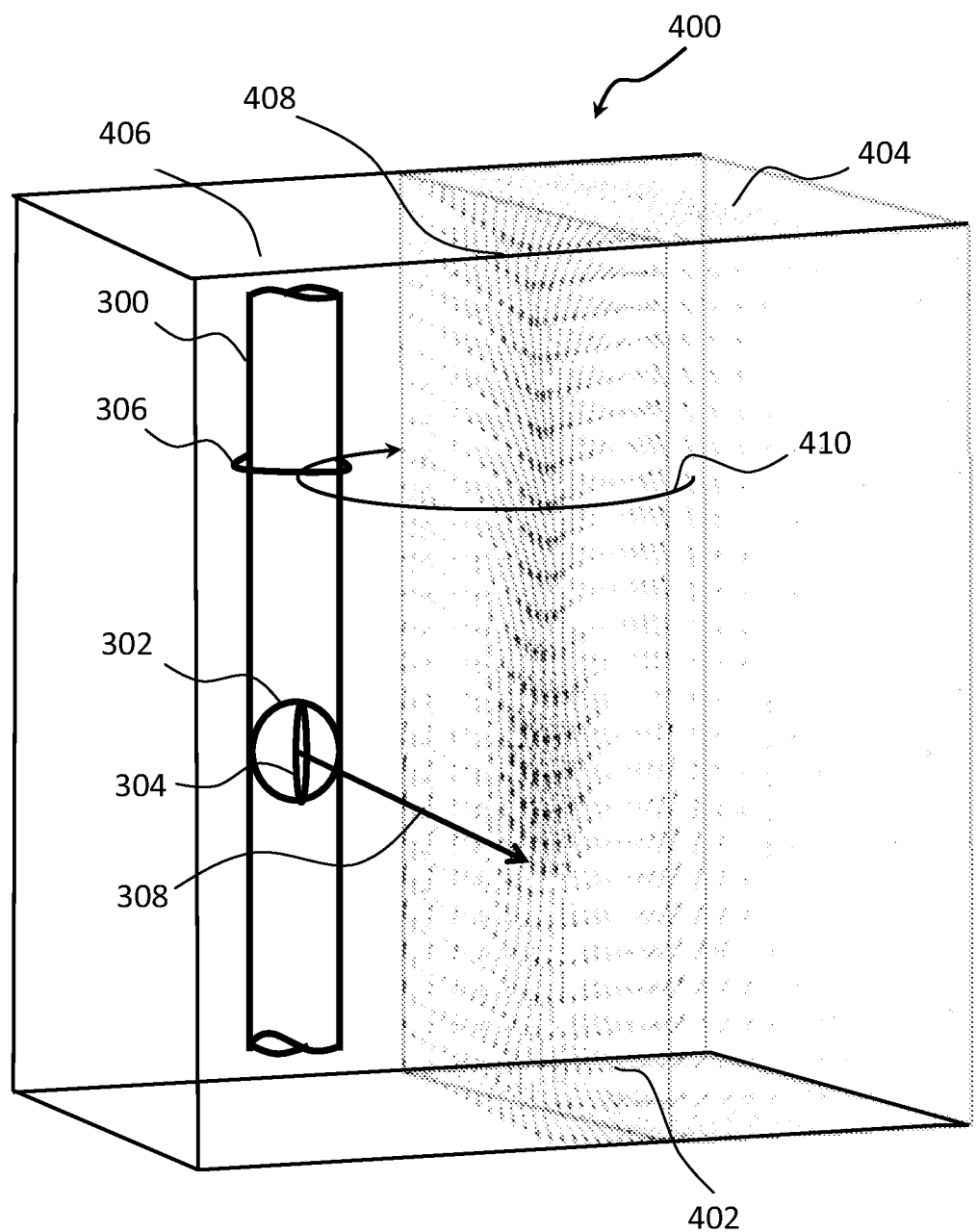
FIG. 4B is a perspective view of three-dimensional illustration of FIG. 4A under a boundary condition according to some embodiments of the present invention.
Figure 4C:
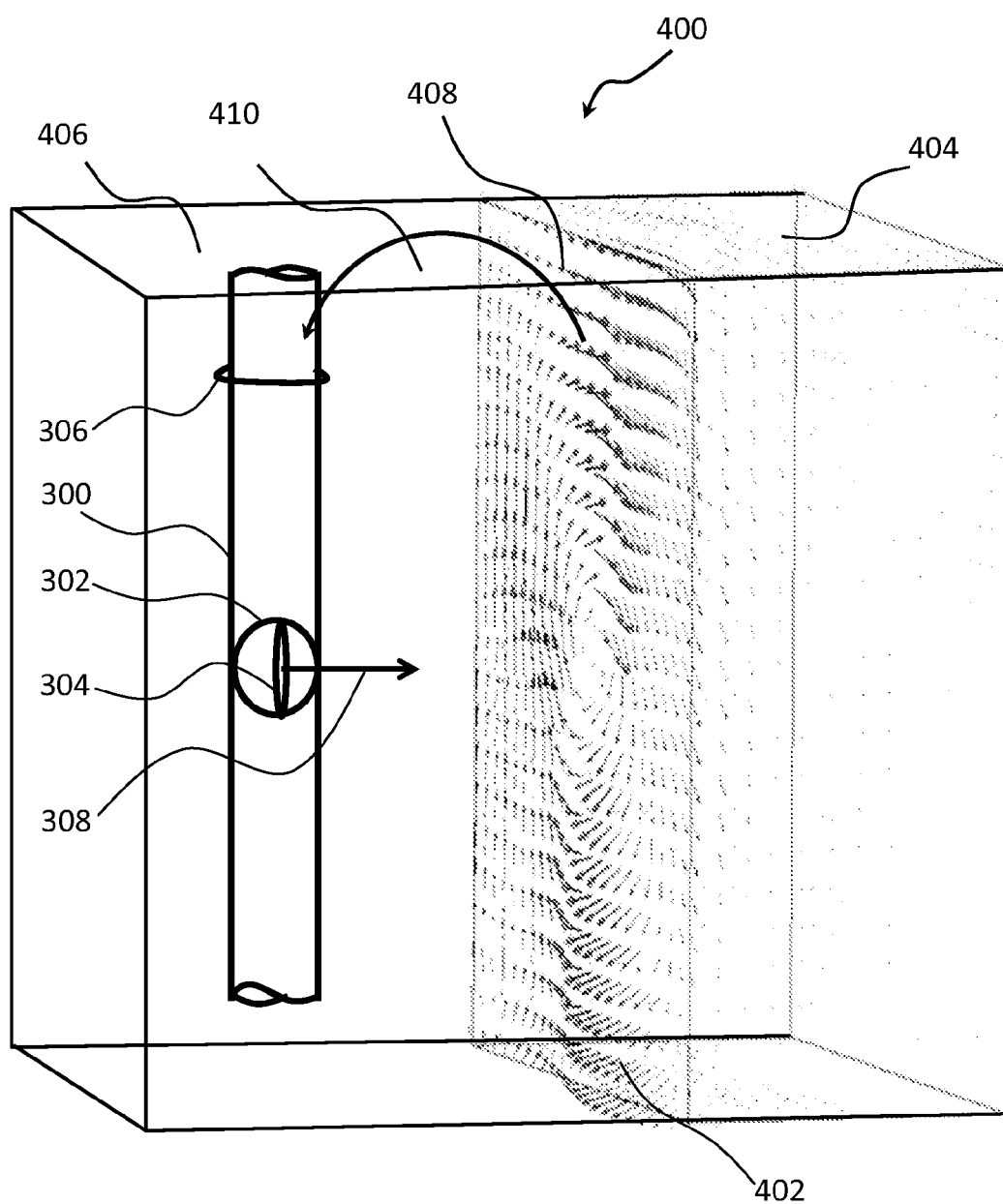
FIG. 4C is a perspective view of three-dimensional illustration of FIG. 4A under another boundary condition according to some embodiments of the present invention.

FIG. 4B and FIG. 4C are a perspective view of three-dimensional illustration of FIG. 4A under two boundary conditions. In FIG. 4B, the electrical rotation vector 308 of the total magnetic moment $\vec{M}$ of the pair of the x-transmitter 304 and the y-transmitter 302 is substantially parallel to the surface of the boundary 402 and in the direction of the negative y-axis. According to the electromagnetic theory, the total magnetic moment $\vec{M}$ of the x-transmitter 304 and the y-transmitter 302 can induce electrical current components 408 to flow in the longitudinal direction of the tool body 300 (z-direction) at the boundary 402. Then, the induced electrical current components 408 flowing in the longitudinal direction of the tool body 300 (z-direction) can generate a secondary magnetic field 410 with an axis parallel to the axis of the z-receiver 306. As a result, the strength of electromagnetic signals induced on the z-receiver 306 would be minimum strength.

In FIG. 4C, the electrical rotation vector 308 of the total magnetic moment $\vec{M}$ of the pair of the x-transmitter 304 and the y-transmitter 302 is substantially perpendicular to the surface of the boundary 402 and in the direction of the positive x-axis. According to the electromagnetic theory, the total magnetic moment $\vec{M}$ of the x-transmitter 304 and the y-transmitter 302 can induce electrical current components 408 to flow in the direction perpendicular to the longitudinal direction (z-direction) of the tool body 300 at the boundary 402. Then, the induced electrical current components 408 flowing in the direction perpendicular to the longitudinal direction (z-direction) of the tool body 300 can generate a secondary magnetic field 410 perpendicular to the surface of the z-receiver 306. As a result, the strength of electromagnetic signals induced on the z-receiver 306 would be maximum strength.

Figure 5A:
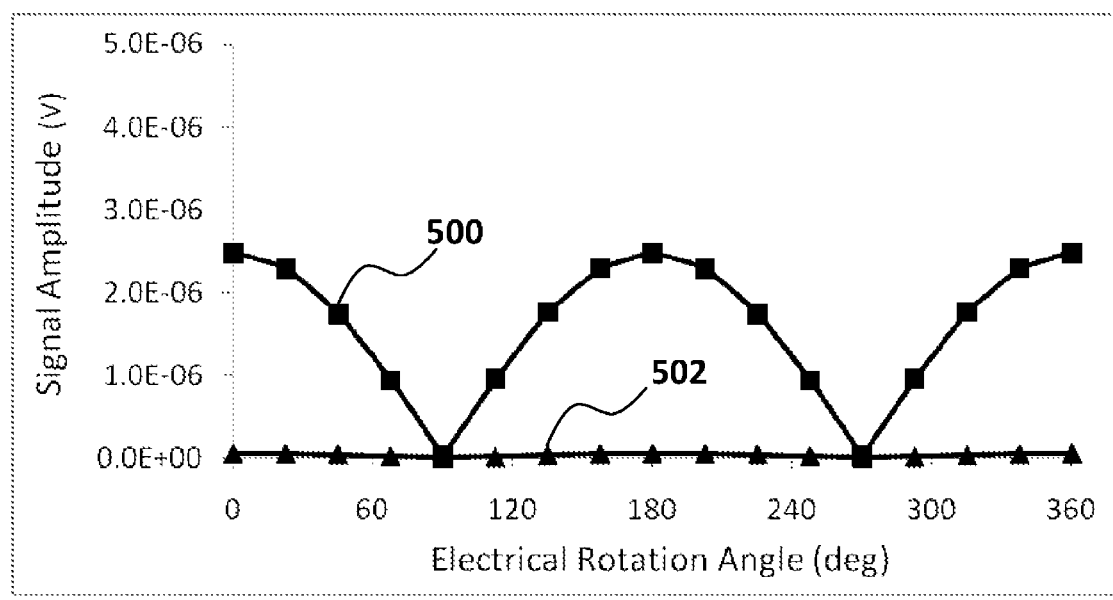
FIG. 5A illustrates modeling results in term of a data graph of signal amplitude versus electrical rotation angle according to some embodiments of the present invention.

FIG. 5A illustrates modeling results in term of a data graph of signal amplitude versus electrical rotation angle according to some embodiments of the present invention. A wave with absolute value of the sine wave 500 represents the amplitudes of induced electromagnetic signals on the z-receiver 306 measured counterclockwise from the positive x-axis at different angles during a complete cycle of electrical rotation (0~360 degrees) when the first formation 404 and the second formation 406 are not the same and have a boundary 402 in between. A nearly straight line 502 represents the amplitudes of induced electromagnetic signals on the z-receiver 306 measured counterclockwise from the positive x-axis at different angles in a complete cycle of electrical rotation (0~360 degrees) when the first formation 404 and the second formation 406 are substantially the same and have no boundary 402 in between (homogeneous formation). Therefore, the presence of the wave with absolute value of the sine wave 500 can indicate the presence of the boundary 402.

Furthermore, FIG. 5A shows that the maximum signal amplitude can be measured when the electrical rotation vector 308 of the total magnetic moment $\vec{M}$ of the pair of the x-transmitter 304 and the y-transmitter 302 is at 0, 180, or 360 degrees. Referring to the boundary condition shown in FIG. 4C, the maximum amplitudes of electromagnetic signals can be induced when the electrical rotation vector 308 of the total magnetic moment $\vec{M}$ of the pair of the x-transmitter 304 and the y-transmitter 302 is substantially perpendicular to the surface of the boundary 402. FIG. 5A also shows that the minimum signal amplitude can be measured when the electrical rotation vector 308 of the total magnetic moment $\vec{M}$ of the pair of the x-transmitter 304 and the y-transmitter 302 is at 90 and 270 degrees. Referring to another boundary condition shown in FIG. 4B, the minimum amplitudes of electromagnetic signals can be induced when the electrical rotation vector 308 of the total magnetic moment $\vec{M}$ of the pair of the x-transmitter 304 and the y-transmitter 302 is substantially parallel to the surface to the boundary 402.

Based on the data provided in FIG. 5A and two boundary conditions illustrated in FIGS. 4B and 4C, it can be concluded that the orientation of the boundary 402 can be derived with the known information of electrical rotation vector 308 of the total magnetic moment $\vec{M}$ of the pair of the x-transmitter 304 and the y-transmitter 302 and the known information of relationship between it and the surface of the boundary 402. For example, the result that the surface of the boundary 402 is substantially on the z-y plane can be derived from the known information that the maximum amplitudes of electromagnetic signals can be induced on the z-receiver 306 when the electrical rotation vector 308 of the total magnetic moment $\vec{M}$ with an angle of 0, 180, or 360 degree measured counterclockwise from the positive x-axis is perpendicular to the surface of the boundary 402. Also, the same results can be derived from the known information that the minimum amplitudes of electromagnetic signals can be induced on the z-receiver 306 when the electrical rotation vector 308 of the total magnetic moment $\vec{M}$ with an angle of 90 or 270 degree measured counterclockwise from the positive x-axis is parallel to the surface of the boundary 402. If the boundary 402 is not substantially on the z-y plan, the amplitudes of electromagnetic signals induced on the z-receiver 306 measured counterclockwise from the positive x-axis at different angles during a complete cycle of electrical rotation (0~360 degrees) would not be the same as the wave with absolute value of the sine wave 500 shown in FIG. 5A.

Figure 1:
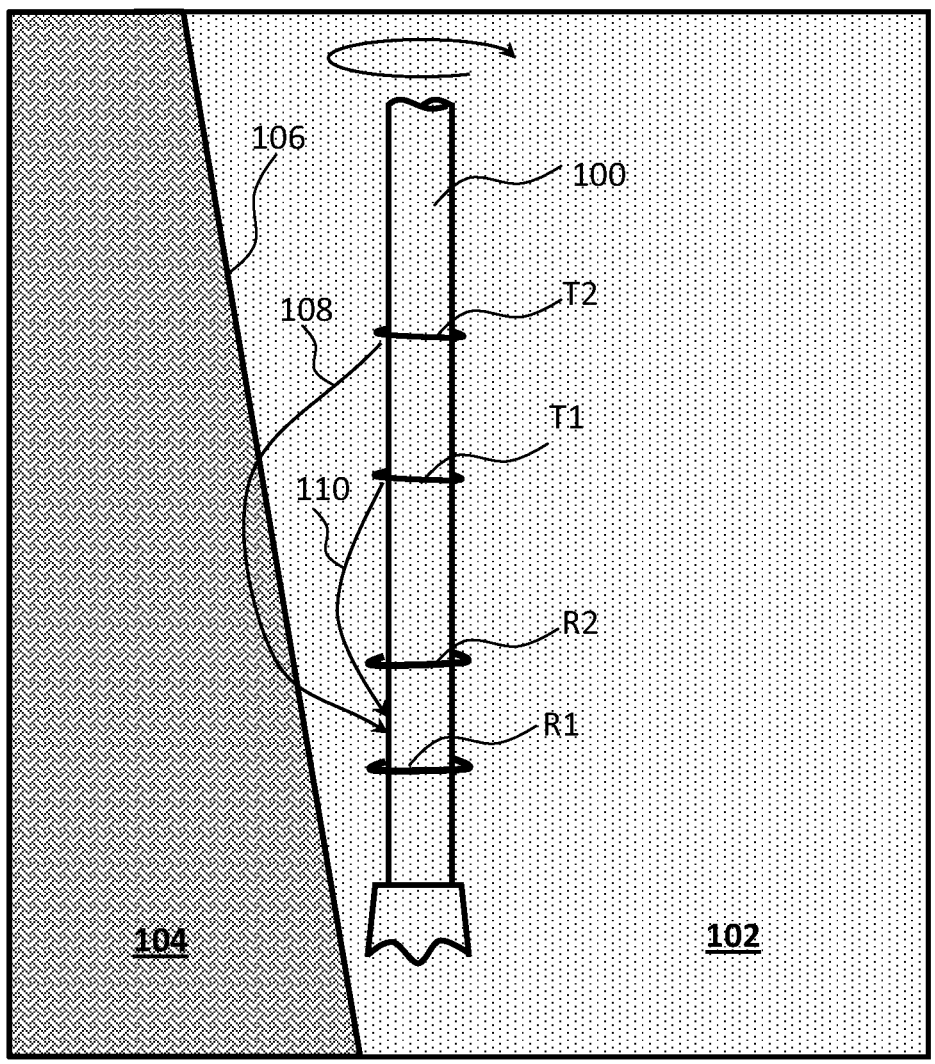
FIG. 1 illustrates a prior art of a conventional resistivity tool.
Figure 2:
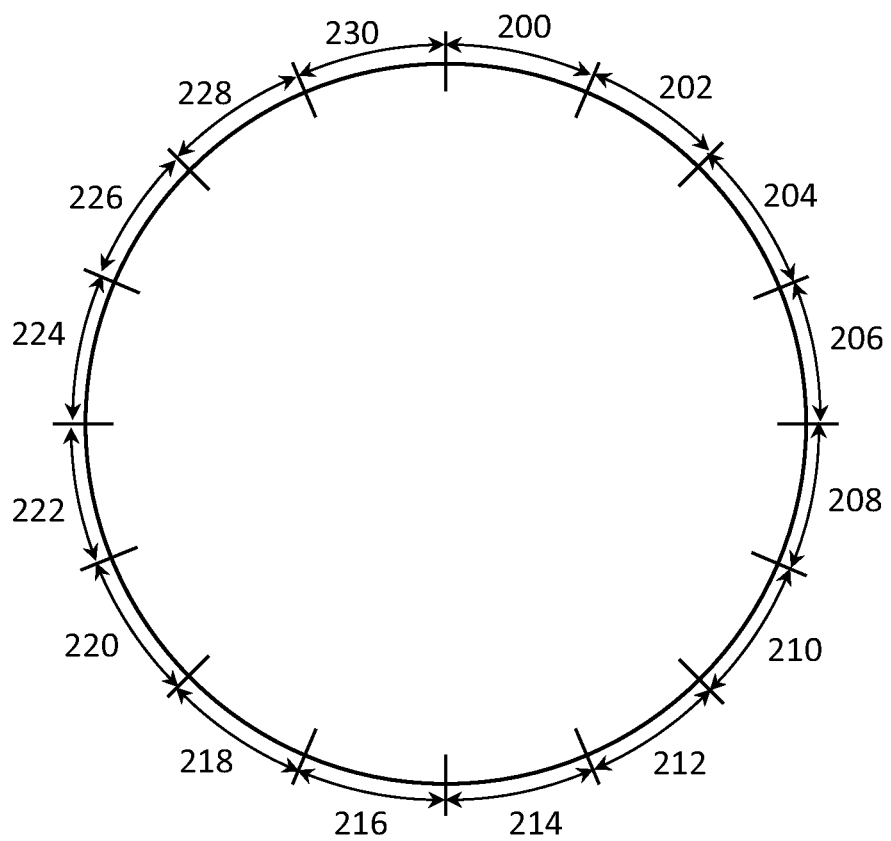
FIG. 2 illustrates a borehole divided into a number of bins (or sectors) for logging.
Figure 5B:
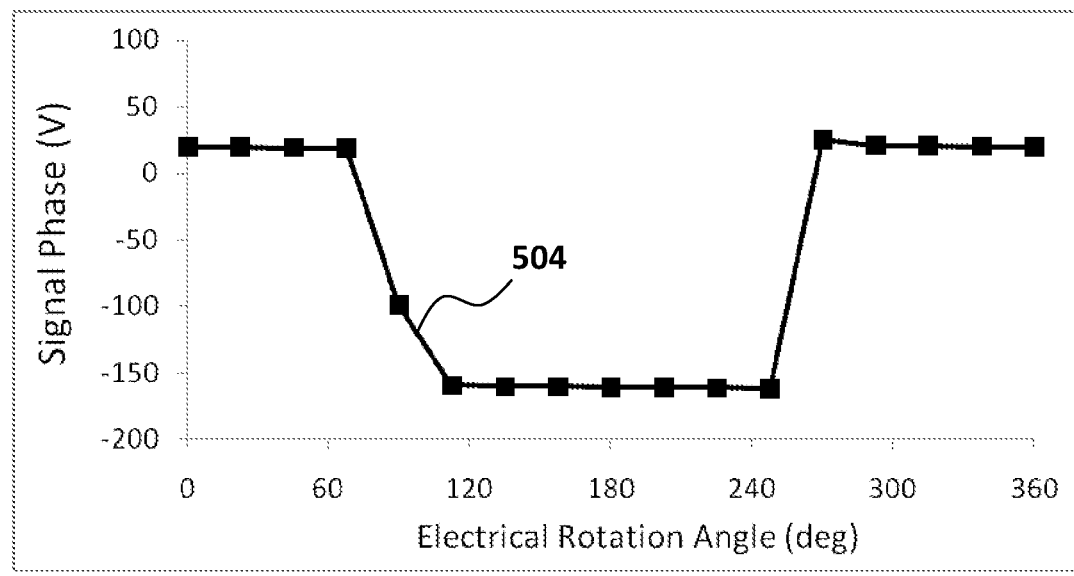
FIG. 5B illustrates modeling results in term of a data graph of signal phase versus electrical rotation angle according to some embodiments of the present invention.

FIG. 5B illustrates modeling results in term of a data graph of signal phase versus electrical rotation angle according to some embodiments of the present invention. A curve 504, which is similar to a sine wave, represents the phases of the induced electromagnetic signals on the z-receiver 306 measured counterclockwise from the positive x-axis at different angles during a complete cycle of electrical rotation (0~360 degrees) when the first formation 404 and the second formation 406 are not the same and have a boundary 402 in between. When the electrical rotation vector 308 of the total magnetic moment $\vec{M}$ of the pair of the x-transmitter 304 and the y-transmitter 302 falls within the sector 310 (0~90 degrees) and the sector 316 (270~360 degrees) as shown in FIG. 2B, the values of the signal phases are positive. When the electrical rotation vector 308 of the total magnetic moment $\vec{M}$ of the pair of the x-transmitter 304 and the y-transmitter 302 falls within the sector 312 (90~180 degrees) and the sector 314 (180~270 degrees) as shown in FIG. 2B, the values of the signal phases are negative. If the boundary 402 is not substantially on the z-y plan, the phases of electromagnetic signals induced on the z-receiver 306 measured counterclockwise from the positive x-axis at different angles during a complete cycle of electrical rotation (0~360 degrees) would not be the same as the curve 504 shown in FIG. 5B.

In conclusion, the orientation of the boundary 402 can be identified according to the data of signal amplitude and signal phase versus electrical rotation angle.

In some embodiments, electromagnetic signals transmitted from the x-transmitter 304 and the y-transmitter 302 can be modulated in a different way. The corresponding magnetic moments of the modulated electromagnetic signals can be expressed in Equation (14) below.

$$\begin{cases} m_x = m_0 \sin(\Omega t) \\ m_y = m_0 \cos(\Omega t) \end{cases} \quad (14)$$

where $m_x$ and $m_y$ can be the magnetic moments applied to the x-transmitter 304 and the y-transmitter 302, respectively; $m_0$ can be the magnitude of the magnetic moment; $\Omega$ can be an angular frequency of the electrical rotation of the magnetic moments of the modulated electromagnetic signals; t can be a length of time from start of the electrical rotation.

Based on the modulation shown in Equation (14), the total magnetic moment $\vec{M}$ of the pair of the x-transmitter 304 and the y-transmitter 302 can be expressed by Equation (15) below.

$$\vec{M} = \hat{x} m_0 \sin(\Omega t) + \hat{y} m_0 \cos(\Omega t) \quad (15)$$

where $\hat{x}$ and $\hat{y}$ denote the unit vector in x-direction and y-direction respectively.

Figure 6A:
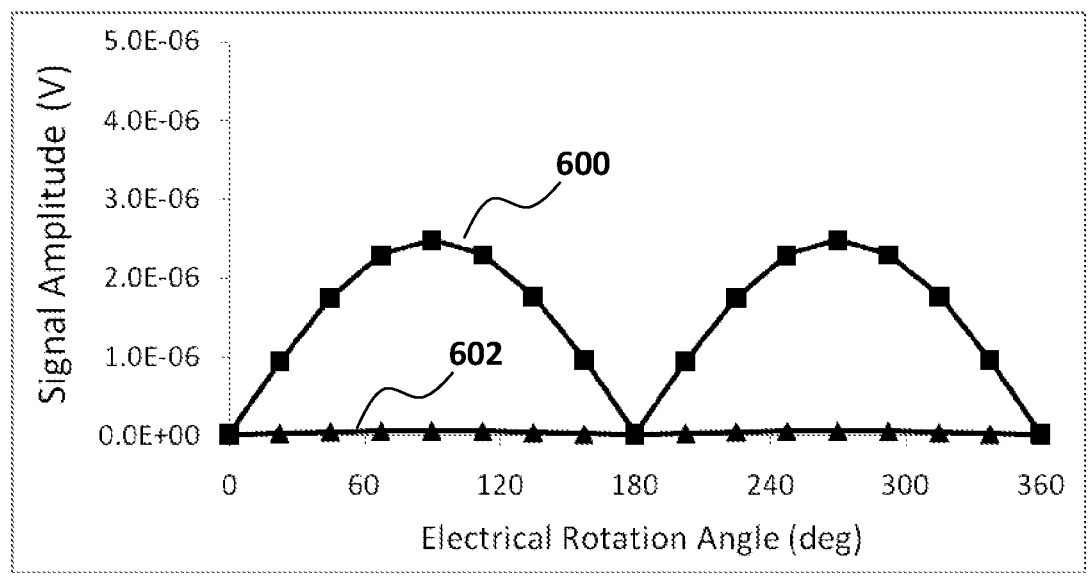
FIG. 6A illustrates modeling results in term of a data graph of signal amplitude versus electrical rotation angle according to other embodiments of the present invention.
Figure 6B:
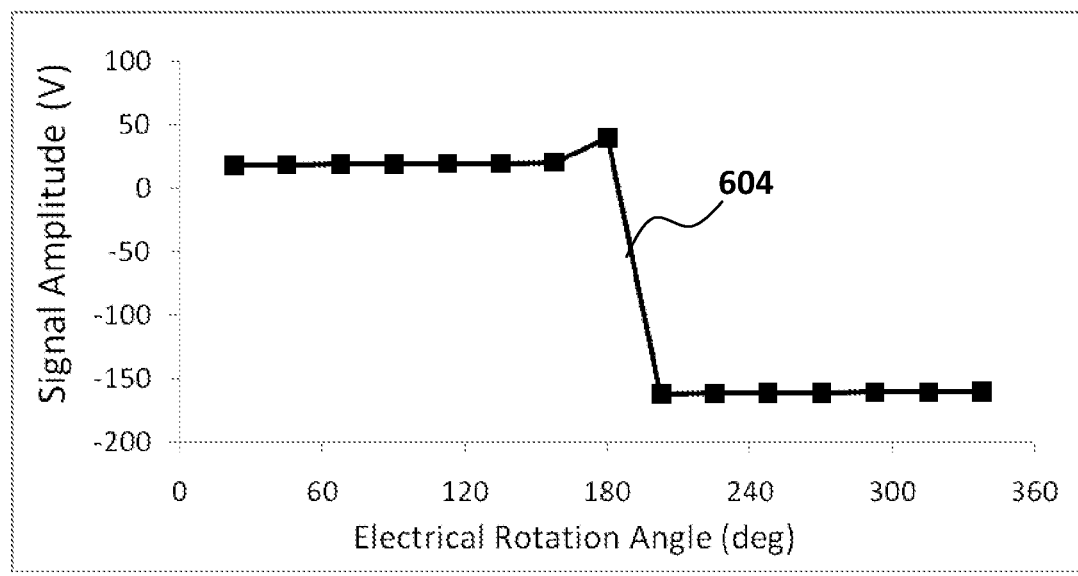
FIG. 6B illustrates modeling results in term of a data graph of signal phase versus electrical rotation angle according to other embodiments of the present invention.

Accordingly, the modeling results in term of a data graph of signal amplitude versus electrical rotation angle as shown in FIG. 6A and the modeling results in term of a data graph of signal phase versus electrical rotation angle as shown in FIG. 6B would not be the same as the data shown in FIGS. 5A and 5B, even though the direction resistivity tool is tested in the same model 400, which has the same boundary 402 on the z-y plane.

The present invention is in no way limited to any particular function or equation to modulate electromagnetic signals.

Figure 7:
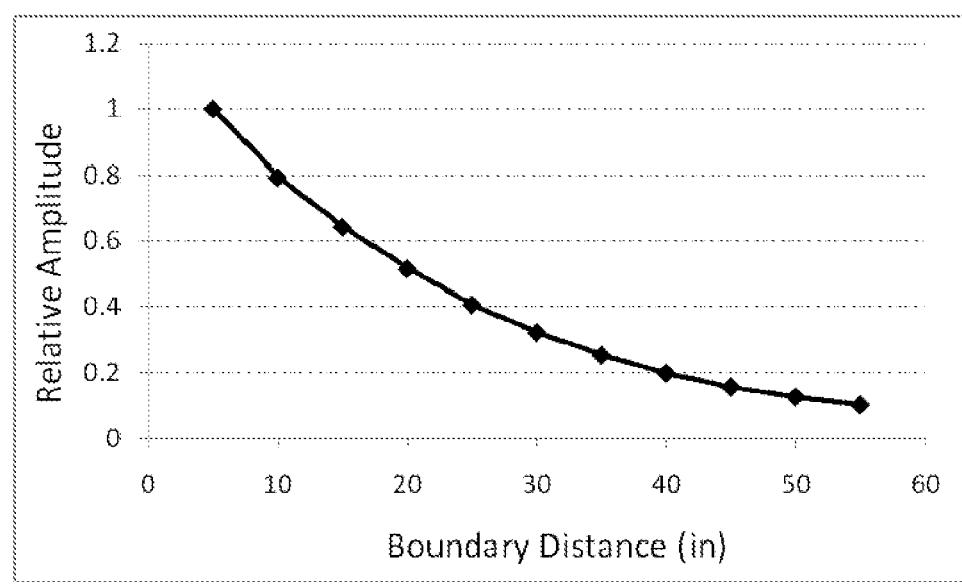
FIG. 7 illustrates modeling results in term of a data graph of relative signal amplitude versus boundary distance according to some embodiments of the present invention.

FIG. 7 illustrates modeling results in term of a data graph of relative signal amplitude versus boundary distance according to some embodiments of the present invention. FIG. 7 shows that the measured amplitudes of the electromagnetic signals induced on the z-receiver 306 can be correlated to the location of the boundary 402. The closer the tool body 300 is to the boundary 402, the stronger signal amplitudes would be.

In conclusion, the location of the boundary 402 can be identified according to the data of amplitudes of electromagnetic signals induced on the z-receiver 306 versus electrical rotation angle.

In some embodiments, the location of the boundary 402 can also be computed according to the correlation between the information of signal amplitude and known formation resistivity, dielectric constant, and permeability.

Figure 8:
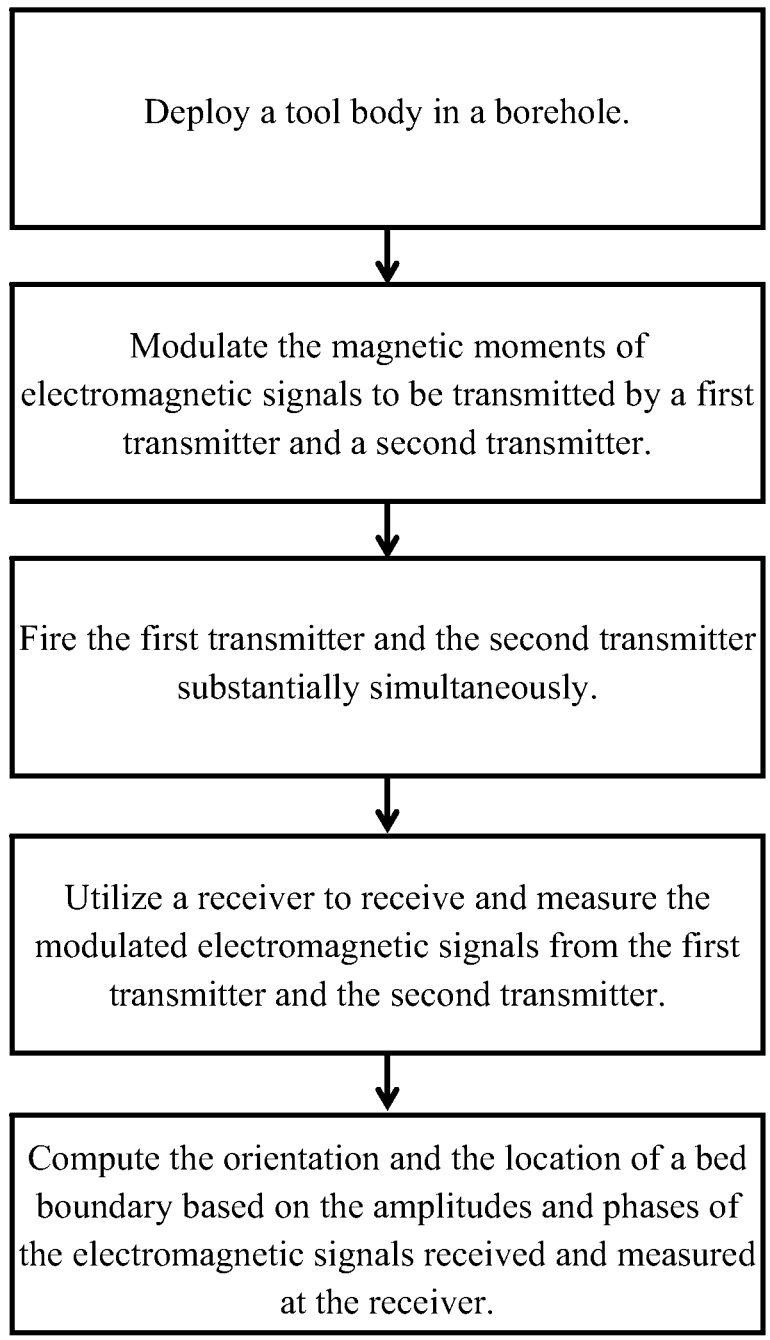
FIG. 8 illustrates a flow chart of a method for bed boundary detection.

FIG. 8 illustrates a flow chart of a method for bed boundary detection. A method for performing detection of a bed boundary includes deploying a tool body in a borehole 800; the tool body being deployed with a first transmitter, a second transmitter, and a receiver, all of which are oriented in different directions, modulating the magnetic moments of electromagnetic signals to be transmitted by the first transmitter and the second transmitter 802, firing the first transmitter and the second transmitter substantially simultaneously 804; wherein the total magnetic moment of the modulated electromagnetic signals transmitted by the first transmitter and the second transmitter electrically rotating during firing, utilizing the receiver to receive and measure the modulated electromagnetic signals from the first transmitter and the second transmitter 806, computing the orientation and location of the bed boundary based on the amplitudes and phases of the electromagnetic signals received and measured at the receiver 808.

In some embodiments, the orientations of the first transmitter, the second transmitter, and the receiver can be substantially perpendicular to each other.

In some embodiments, the orientation of the receiver can be substantially parallel to the longitudinal axis of the tool body.

In some embodiments, the method for performing detection of a bed boundary includes providing an equation $$\begin{cases} m_1 = m_0 \cos(\Omega t) \\ m_2 = m_0 \sin(\Omega t) \end{cases}$$

to modulate the magnetic moments of electromagnetic signals to be transmitted by the first and the second transmitters; where $m_1$ and $m_2$ can be the magnetic moments applied to the first transmitter and the second transmitter, respectively; $m_0$ can be the magnitude of the magnetic moment; $\Omega$ can be an angular frequency of the electrical rotation of the magnetic moments of the modulated electromagnetic signals; and t can be a length of time from start of the electrical rotation.

In some embodiments, the angular frequency can be adjustable.

In some embodiments, the method for performing detection of a bed boundary includes measuring the modulated electromagnetic signals from the first transmitter and the second transmitter at different electrical rotation angles (different bins or sectors).

In some embodiments, the method for performing detection of a bed boundary includes providing a conversion chart to facilitate a computation of the orientation and location of the bed boundary based on the amplitudes and phases of the electromagnetic signals received and measured at the receiver. In some embodiments, the method for performing detection of a bed boundary includes retrieving information of formation resistivity from a logging tool which is coupled with the tool body.

In some embodiments, the method for performing detection of a bed boundary includes providing a conversion chart to facilitate a computation of the orientation and location of the bed boundary based on the amplitudes and phases of the electromagnetic signals received and measured at the receiver and the information of formation resistivity retrieved from a logging tool.

The present invention is in no way limited to any particular order of steps or requires any particular step illustrated in FIG. 8.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method for performing detection of a bed boundary comprising:

deploying a tool body with a longitudinal axis in a borehole; wherein the tool body being deployed with a first transmitter, a second transmitter, and a receiver, all of which are oriented in different directions;

modulating the magnetic moments of electromagnetic signals to be transmitted by the first transmitter and the second transmitter;

firing the first transmitter and the second transmitter substantially simultaneously; wherein the vector of the total magnetic moment of the modulated electromagnetic signals electrically rotating during firing;

utilizing the receiver to receive and measure the modulated electromagnetic signals from the first transmitter and the second transmitter; and computing the orientation and location of the bed boundary based on the amplitudes and phases of the electromagnetic signals received and measured at the receiver.

2. The method for performing detection of a bed boundary according to claim 1 wherein the orientations of the first transmitter, the second transmitter, and the receiver are substantially perpendicular to each other.

3. The method for performing detection of a bed boundary according to claim 2 wherein the orientation of the receiver is substantially parallel to the longitudinal axis of the tool body.

4. The method for performing detection of a bed boundary according to claim 1 further comprises providing an equation $$\begin{cases} m_1 = m_0\cos(\Omega t) \\ m_2 = m_0\sin(\Omega t) \end{cases}$$

to modulate the magnetic moments of the electromagnetic signals to be transmitted by the first and the second transmitters; wherein $m_1$ and $m_2$ are magnetic moments applied to the first transmitter and the second transmitter, respectively; $m_0$ is the magnitude of the magnetic moment; $\Omega$ is an angular frequency of the electrical rotation of the magnetic moments of the modulated electromagnetic signals; and t is a length of time from start of the electrical rotation.

5. The method for performing detection of a bed boundary according to claim 4 wherein the angular frequency is adjustable.

6. The method for performing detection of a bed boundary according to claim 1 further comprises measuring the modulated electromagnetic signals from the first transmitter and the second transmitter at different electrical rotation angles.

7. The method for performing detection of a bed boundary according to claim 1 further comprises providing a conversion chart to facilitate a computation of the orientation and location of the bed boundary based on the amplitudes and phases of the electromagnetic signals received and measured at the receiver.

8. The method for performing detection of a bed boundary according to claim 1 further comprises retrieving information of formation resistivity from a logging tool which is coupled with the tool body.

9. The method for performing detection of a bed boundary according to claim 8 further comprises providing a conversion chart to facilitate a computation of the orientation and location of the bed boundary based on the amplitudes and phases of the electromagnetic signals received and measured at the receiver and the information of formation resistivity retrieved from the logging tool.

10. An apparatus for detection of a bed boundary comprising:

a tool body with a longitudinal axis;

a first transmitter deployed on the tool body and oriented in a first direction;

a second transmitter deployed on the tool body and oriented in a second direction;

wherein the first transmitter and the second transmitter transmitting electromagnetic signals, the magnetic moments of which are modulated to make the vector of the total magnetic moment of the electromagnetic signals to electrically rotate while the first transmitter and the second transmitter are fired substantially simultaneously;

a receiver deployed on the tool body and oriented substantially parallel to the longitudinal axis of the tool body; and wherein the receiver receiving and measuring the modulated electromagnetic signals from the first transmitter and the second transmitter and computing the orientation and location of the bed boundary based on the measured amplitudes and phases of the electromagnetic signals.

11. The apparatus for detection of a bed boundary according to claim 10 wherein the tool body is a drill string or a drill collar.

12. The apparatus for detection of a bed boundary according to claim 10 wherein the first transmitter is collocated with or at an axial distance from the second transmitter.

13. The apparatus for detection of a bed boundary according to claim 10 wherein all of the first transmitter, the second transmitter, and the receiver comprise at least one antenna.

14. The apparatus for detection of a bed boundary according to claim 10 wherein the first direction of the first transmitter is substantially perpendicular to the second direction of the second transmitter.

15. The apparatus for detection of a bed boundary according to claim 14 wherein the receiver is oriented perpendicular to the first direction of the first transmitter and the second direction of the second transmitter.

16. The apparatus for detection of a bed boundary according to claim 10 wherein the electromagnetic signals are modulated according to an equation $$\begin{cases} m_1 = m_0\cos(\Omega t) \\ m_2 = m_0\sin(\Omega t) \end{cases};$$

wherein $m_1$ and $m_2$ are magnetic moments applied to the first transmitter and the second transmitter, respectively; $m_0$ is the magnitude of the magnetic moment; $\Omega$ is an angular frequency of the electrical rotation of the magnetic moments of the modulated electromagnetic signals; and t is a length of time from start of the electrical rotation.

17. The apparatus for detection of a bed boundary according to claim 10 wherein the first and second transmitters comprise a transmitter circuit to modulate the electromagnetic signals to be transmitted.

18. The apparatus for detection of a bed boundary according to claim 10 wherein the receiver comprises a receiver circuit configured to process the received electromagnetic signals and analyze their amplitudes and phases.

19. The apparatus for detection of a bed boundary according to claim 18 wherein the receiver circuit is coupled with a processor configured to help compute the orientation and location of the bed boundary.

20. The apparatus for detection of a bed boundary according to claim 19 wherein the processor is coupled with a storage device which is stored with a conversion chart to facilitate a computation of the orientation and location of the bed boundary based on the amplitudes and phases of the electromagnetic signals received and measured at the receiver.

21. An apparatus for detection of a bed boundary comprising:
- a tool body with a longitudinal axis;
- a first transmitter deployed on the tool body;
- a second transmitter deployed on the tool body and substantially perpendicular to the first transmitter;
- wherein the first transmitter and the second transmitter transmitting electromagnetic signals, the magnetic moments of which are modulated to make the vector of the total magnetic moment of the electromagnetic signals to electrically rotate as a function of time while the first transmitter and the second transmitter are fired substantially simultaneously;
- a receiver deployed on the tool body and oriented substantially parallel to the longitudinal axis of the tool body; and
- wherein the receiver receiving and measuring the modulated electromagnetic signals from the first transmitter and the second transmitter and computing the orientation and location of the bed boundary based on the measured amplitudes and phases of the electromagnetic signals.

22. The apparatus for detection of a bed boundary according to claim 21 further comprises a logging tool for measuring formation resistivity.

23. The apparatus for detection of a bed boundary according to claim 22 wherein the receiver comprises a conversion chart to convert the correlated information of the amplitudes of the electromagnetic signals measured at the receiver and formation resistivity measured by the logging tool into the orientation and location of the bed boundary.

* * * * *